Aug. 8, 1933.  L. S. FRAPPIER ET AL  1,921,870

FILM MAGAZINE CLOSURE

Original Filed June 29, 1929  2 Sheets-Sheet 1

INVENTORS
Louis S. Frappier
Ewald Boecking
BY
Austin & Dix
ATTORNEYS

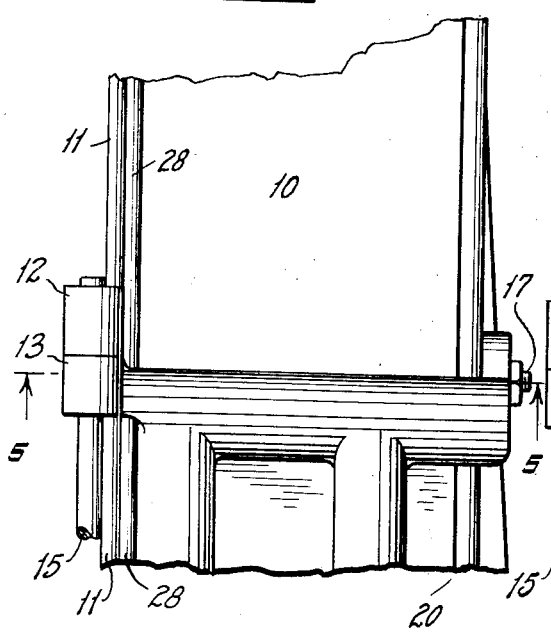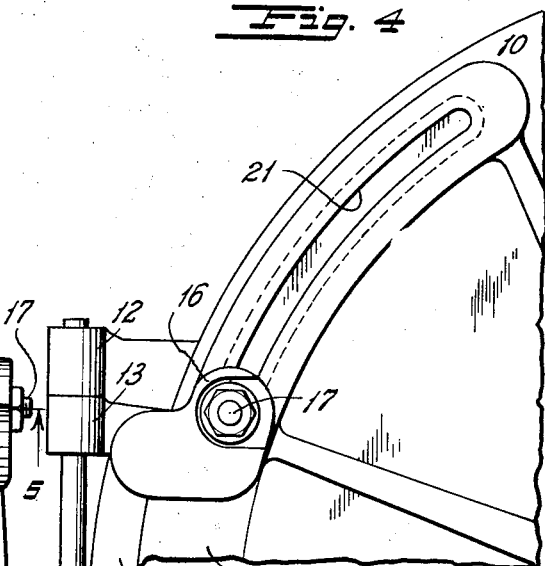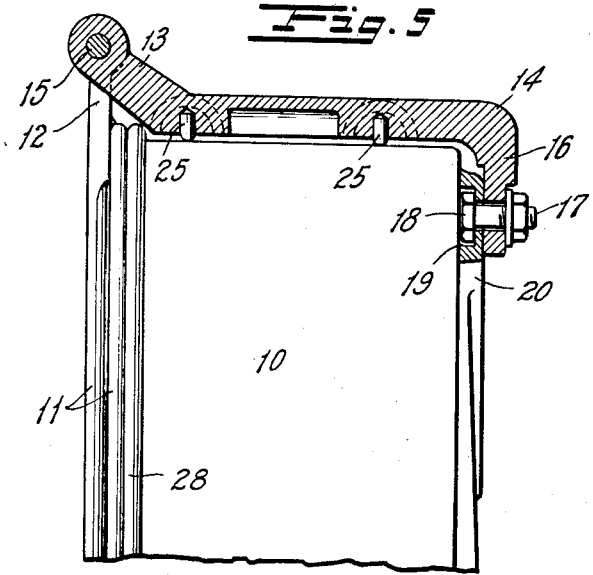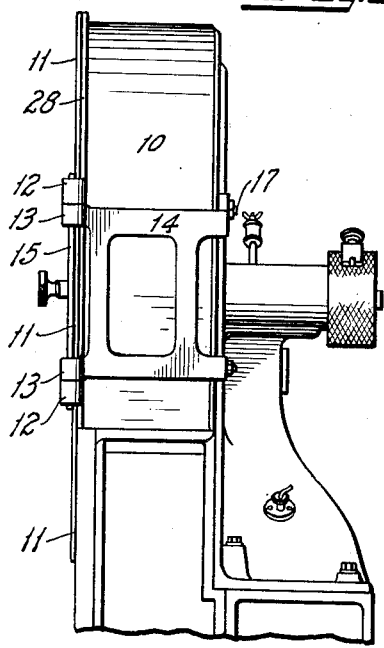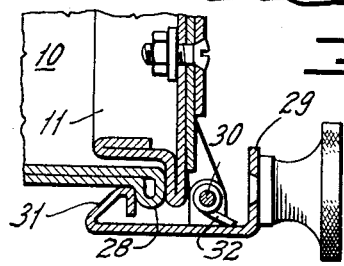

Patented Aug. 8, 1933

1,921,870

UNITED STATES PATENT OFFICE 1,921,870

FILM MAGAZINE CLOSURE

Louis Simon Frappier and Ewald Boecking, Brooklyn, N. Y., assignors to International Projector Corporation, New York, N. Y., a Corporation of Delaware Original application June 29, 1929, Serial No. 374,676. Divided and this application July 24, 1930. Serial No. 470,352

9 Claims. (Cl. 220—37)

This invention relates to motion picture projection machines, and more particularly to a film magazine closure and to mechanism for supporting the same.

This application is a division of our copending application Serial No. 374,676, filed June 29, 1929 for motion picture projection machines.

An object of the invention is to provide means whereby the maximum clearance may be obtained for the door of the upper film magazine regardless of the angle at which the projector is operated.

Another object is to provide a support for the door hinge which may be adjusted about the periphery of the film magazine so that the door may be opened in a horizontal position.

A feature of the invention is an adjustable hinge which is mounted for movement about the periphery of the film magazine casing.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a rear elevation of the film magazine showing the hinge for the door;

Fig. 3 is a detailed view of the hinge;

Fig. 4 is a side elevation of the mechanism shown in Fig. 3;

Fig. 5 is a section taken on the line 5—5 of Fig. 3;

Fig. 6 is an end elevation of the film magazine and hinge; and

Fig. 7 is a sectional view showing the latch and cooperating flange.

Like reference characters denote like parts in the several figures of the drawings.

Figure 1:
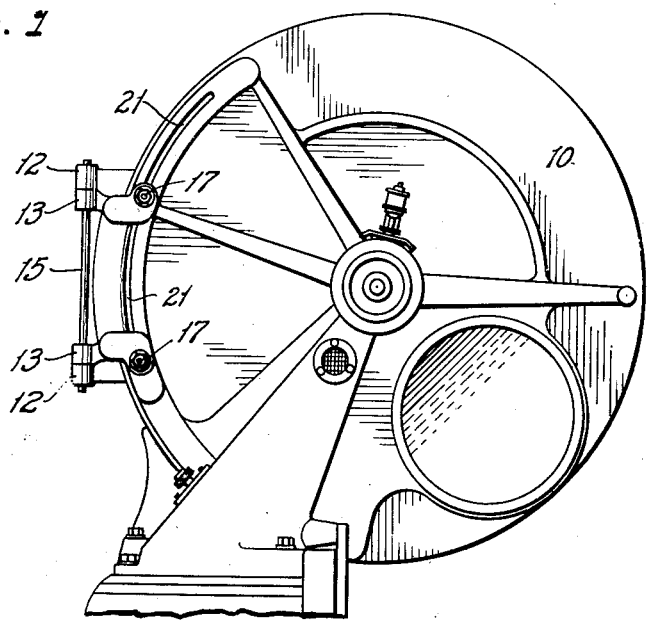
Figure 2:
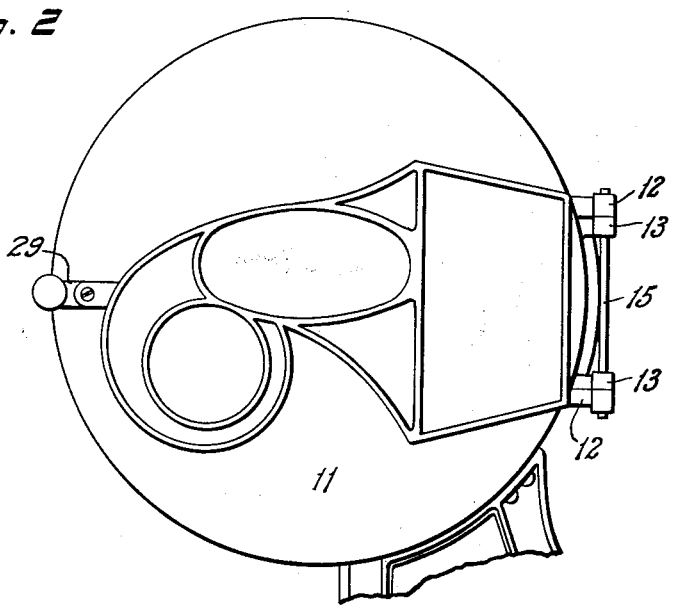
Fig. 2 is a front elevation of the film magazine showing the position of the door.

In the following description and in the claims parts will be identified by specific names for convenience, but they are intended to be as generic in their application to similar parts as the art will permit.

Referring to the drawings more in detail the invention is shown as applied to a film magazine 10 having a door 11 associated therewith. Said door is provided with a pair of hinge lugs 12 which cooperate with hinge lugs 13 formed on a frame 14 and are held in aligned position therewith by means of rod 15. A suitable latch mechanism, to be described is provided for maintaining the door in closed position. Frame 14 of the hinge is provided with an inturned flange 16 (Fig. 5) which is drilled to receive bolts 17. Said bolts are provided with heads 18 which seat in peripheral grooves 19 formed in the housing 20 of the film magazine. Peripheral slots 21 (Fig. 4) are provided through which bolts 17 extend. Pins 25 are mounted in frame 14 in position to contact with the surface of the film magazine and to control the position of said frame as it is slidably moved thereover.

The casing of film magazine 10 is provided with a peripheral flange 28 which is adapted to cooperate with a latch mechanism regardless of the angular position of the door. The latch for this purpose comprises a member 29 which is pivotally secured to door 11 as at 30 and is provided with an inturned flange 31 which bears against flange 28 and secures the door in closed position. Spring 32 is secured about pivot 30 and normally holds the latch in engagement with said flange. It will be noted that no portion of the latch mechanism extends inside of the casing and furthermore that the latch may operate on any portion of the periphery thereof.

It will be noted that the above mechanism provides for peripheral movement of the frame over the surface of the film magazine during which bolts 17 slide in slots 21 and heads 18 of said bolts slide in grooves 19. When the desired angular adjustment of said frame is obtained, preferably such that the door opens in a horizontal position, the frame may be clamped by tightening bolts 17 thereby bringing flange 16 into engagement with housing 20 and firmly securing the parts against further movement. The main support is obtained by means of the above bolts when the apparatus is clamped in position. However, when the hinge is being adjusted pins 25 serve to maintain the frame in substantial parallelism with the surface of the film magazine and assist in supporting the weight of the door. It is understood that the latch 16 is so formed that it will cooperate with a flange on the film magazine for maintaining the door in closed position regardless of the angular position of the door with respect to said magazine.

The adjustable hinge for the door permits the door to be swung into horizontal position regardless of the angular position of the projection machine whereby a maximum clearance is obtained between the door and the wall of the projection room, and the latch mechanism is so constructed that it is capable of cooperating with the casing regardless of the angular position of the door with respect thereto.

This construction is particularly important in instances where the projection machine is operated at a substantial angle to the horizontal since the door is frequently brought into close proximity to the wall of the projection room and would be prevented from opening to its full extent. Furthermore, in the case of a large machine having a comparatively heavy door it is a distinct advantage to adjust the hinge so that the door will open in a horizontal position in order to prevent the door from tending to shut or open due to the force of gravity.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination, a casing having a circular opening, a door for closing said opening, means for hingedly mounting said door comprising a hinge and means for peripherally adjusting said hinge with respect to said opening, comprising clamping devices carried on said hinge and extending through arcuate slots on said casing.

2. In combination, a circular casing, a door for closing said casing, a hinge for mounting said door, a bracket carrying said hinge and extending across the periphery of said casing, and means for slidably securing said bracket to the back of said casing whereby the angular position of said door may be varied.

3. In combination, a circular casing having a back provided with a peripheral channel, a door for closing said casing, a hinge for mounting said door, a bracket carrying said hinge and extending across the periphery of said casing and means for slidably securing said bracket in said channel whereby the angular position of said door may be varied.

4. In combination, a casing, a door for closing said casing, a hinge for supporting said door, a frame carrying said hinge and means for securing said frame to said casing comprising members secured to said frame and extending through arcuate slots in said casing and adapted to permit rotary movement of said frame and to clamp said frame to said casing in any selected position.

5. In combination, a casing, a door therefor, a supporting frame, a hinge for said door comprising cooperating hinge lugs carried by said door and said frame respectively and held in aligned position by a rod extending therethrough, said frame extending across the periphery of said casing and having an inturned flange engaging a portion of the back of said casing and means for clamping said flange to said back portion comprising bolts extending through a peripheral groove in said back portion and into said flange, said bolts having heads engaging a peripheral channel formed internally of said back portion and being adapted to clamp said flange thereto.

6. In combination, a circular casing, a door for closing said casing and a hinge for said door comprising a frame slidably mounted for movement about the periphery of said casing and spaced therefrom, means for clamping said frame in a selected position and means for maintaining said frame in correct position with respect to said casing during peripheral movement comprising members carried by said frame and adapted to engage the periphery of said casing.

7. In a film magazine having a casing, a door for closing said casing, hinge means for mounting said door, said means being slidable about the periphery of said casing whereby the angular position of said door may be adjusted, said casing having a peripheral flange extending around a portion of the periphery of said casing, at least equal to the range of adjustment of said hinge, and latch means carried by said door and adapted to engage said flange in any angular position of said door.

8. In a film magazine having a casing, a door for closing said casing, hinge means for mounting said door, said means being slidable about the periphery of said casing whereby the angular position of said door may be adjusted, said casing having a peripheral flange extending around a portion of the periphery of said casing, at least equal to the range of adjustment of said hinge, and a latch mechanism comprising a member having an inturned flange adapted to engage said peripheral flange regardless of the angular position of said door.

9. In a film magazine having a casing, a door for closing said casing, hinge means for mounting said door, said means being slidable about the periphery of said casing whereby the angular position of said door may be adjusted, said casing having a peripheral flange extending around a portion of the periphery of said casing, at least equal to the range of adjustment of said hinge, and a latch mechanism comprising a member having an inturned flange adapted to engage said peripheral flange regardless of the angular position of said door, and resilient means for normally holding said flanges in engagement.

LOUIS S. FRAPPIER.
EWALD BOECKING.